(12) United States Patent
Thielen et al.

(10) Patent No.: US 6,852,790 B2
(45) Date of Patent: Feb. 8, 2005

(54) CONDUCTIVE POLYMER COMPOSITIONS AND ARTICLES CONTAINING SAME

(75) Inventors: Alain Thielen, Thimister (BE); Sandeep Bhatt, Danvers, MA (US)

(73) Assignee: Cabot Corporation, Boston, MA (US)

( * ) Notice: Subject to any disclaimer, the term of this patent is extended or adjusted under 35 U.S.C. 154(b) by 359 days.

(21) Appl. No.: 09/828,275

(22) Filed: Apr. 6, 2001

(65) Prior Publication Data

US 2003/0013797 A1 Jan. 16, 2003

(51) Int. Cl.$^7$ ............................................... C08K 3/04
(52) U.S. Cl. ..................................... 524/496; 524/495
(58) Field of Search ................................. 524/445, 496

(56) References Cited

U.S. PATENT DOCUMENTS

| | | | |
|---|---|---|---|
| 4,545,927 A | * 10/1985 | Railsback | .................... 252/511 |
| 5,705,555 A | 1/1988 | Guilfoy et al. | |
| 4,775,778 A | * 10/1988 | van Konynenburg et al. | .................... 219/549 |
| 5,174,924 A | * 12/1992 | Yamada et al. | .............. 252/511 |
| 5,200,164 A | 4/1993 | Medalia et al. | |
| 5,484,838 A | 1/1996 | Helms et al. | |
| 5,554,739 A | 9/1996 | Belmont | |
| 5,707,432 A | 1/1998 | Adams et al. | |
| 5,725,650 A | 3/1998 | Flenniken et al. | |
| 5,747,559 A | 5/1998 | Whitehouse et al. | |
| 5,837,045 A | 11/1998 | Johnson et al. | |
| 5,837,766 A | 11/1998 | Metro et al. | ................. 524/495 |
| 5,844,037 A | 12/1998 | Lundgard et al. | |
| 5,851,280 A | 12/1998 | Belmont et al. | |
| 5,871,706 A | 2/1999 | Whitehouse | |
| 5,872,177 A | 2/1999 | Whitehouse | |
| 5,877,250 A | 3/1999 | Sant | |
| 5,902,517 A | 5/1999 | Thielen | |
| 6,001,207 A | 12/1999 | Enlow et al. | ................ 156/230 |
| 6,042,643 A | 3/2000 | Belmont et al. | |
| 6,086,792 A | 7/2000 | Reid et al. | |
| 6,156,837 A | 12/2000 | Branan, Jr. et al. | |

FOREIGN PATENT DOCUMENTS

| | | | |
|---|---|---|---|
| WO | WO 99 23174 | 5/1999 | |
| WO | WO 99 41304 | 8/1999 | |
| WO | WO 00/49076 | 8/2000 | ............. C08K/3/04 |
| WO | WO 01/40384 A1 | 6/2001 | ............. C09C/1/48 |
| WO | WO 97/28222 | 6/2001 | ............. C09C/1/50 |

OTHER PUBLICATIONS

Study on Effect of Carbon Black On Behavior Of Conductive Polymer Composites With Positive Temperature Coefficient. Shijian Luo and C.P. Wong, Fellow, IEEE Transaction on Components and Packaging Technologies, vol. 23, No. 1, March 2000, pp. 151–156.

International Search Report for PCT/US02/10255.

Copy of U.S. patent application No. 09 728,706.

"Conductive Modified Polyamide Compound for Molding," Cabot Creating What Matters Brochure. Publication No. 3826, dated 2001, 2 sheets.

"Polypropylene Compound for Molding," Cabot Creating What Matters Brochure. Publication No. 3839. dated 2001, 2 sheets.

"Polypropylene Compound for Molding," Cabot Creating What Matters Brochure. Publication No. 3840. dated 2001, 2 sheets.

"Conductive Polyacetal Compound" Cabot Creating What Matters Brochure. Publication No. 3899. dated 2001, 2 sheets.

Two (2) charts showing Cabot brands and their properties.

* cited by examiner

*Primary Examiner*—Edward J. Cain

(57) ABSTRACT

Polymer compositions, which are particularly useful in automotive applications, are described. The polymer composition contain at least one polymer and at least one carbon black having an STSA (statistical thickness surface area) of from about 10 to about 200 m$^2$/g, an I$_2$No of from about 15 to about 250 mg/g, a tinting strength about 130% or less, a DBPA of from about 20 to about 450 cc/100 g, a CDBP of from about 20 to about 400 cc/100 g, a ratio of I$_2$No to STSA of from about 0.4 to about 2.5, a particle size of from about 14 to about 250 nm, and a % volatiles of less than about 5.0%. Articles for automotive applications and other applications, as well as a method for electrostatically painting an article are also disclosed.

53 Claims, No Drawings

CONDUCTIVE POLYMER COMPOSITIONS AND ARTICLES CONTAINING SAME

BACKGROUND OF THE INVENTION

The present invention relates to conductive polymer compositions containing a polymer and a carbon black with specified properties as well as to the use of these conductive polymer compositions in articles for such uses as automotive applications and the like. The present invention further relates to a method of electrostatic painting of an article using these conductive polymer compositions and to the resulting painted article.

Polymeric materials offer several advantages over metals as a material for automotive applications, and consequently are becoming a material of choice for many automotive components. For example, polymeric materials are preferably used for almost all of the components of an automotive fuel system, such as the fuel inlet, filler neck, fuel tanks, fuel lines, fuel filter, and pump housings. Many of these polymeric compounds, however, are non-conducting materials.

Today, automobiles contain more and more electronically operated devices, such as anti-lock brake systems (ABS), electronic fuel injection, satellite based global positioning systems (GPS), and onboard central computers. In order to ensure the safe operation of all of these devices, polymeric materials which provide electrostatic discharge protection and electrostatic dissipative (ESD) properties to automobile parts such as the internal trim, dashboards, panel, seat fibers, switches, and housings are needed.

In addition, electrostatic painting (ESP) is often used to prepare the coated articles for automotive applications. In ESP, a paint or coat is ionized or charged and sprayed on the grounded or conductive article. The electrostatic attraction between the paint or coating and the grounded article results in a more efficient painting process with less wasted paint material and more consistent paint coverage for simple and complex shaped articles. However, polymeric materials that are used in the automotive industry for superior corrosive properties and reduced weight property are typically insulative and non-conducting.

In electromotive coating processes, an electrical potential is used between the substrate being coated and the coating material in order to provide an efficient painting process. In more detail, a paint or coating is charged or ionized and sprayed on a grounded article. The electrostatic attraction between the paint or coating and the grounded, conductive article results in a more efficient painting process with less wasted paint material. Furthermore, an additional benefit of the process is a thicker and more consistent paint coverage. When articles fabricated from metals are painted, the metal which is inherently conductive, is easily grounded and efficiently painted. However, with the use of polymeric materials in the manufacture of many articles, especially automotive applications, the polymers are insufficiently conductive or not conductive at all and therefore do not obtain satisfactory paint thickness and coverage when the article is electrostatically painted. In an effort to overcome this difficulty, compositions containing conductive fibers have been used as well as the use of ion-conductive metal salts. In addition, U.S. Pat. No. 5,844,037, which is incorporated in its entirety by reference herein, provides a mixture of polymers with an electrically-conductive carbon. As shown in that patent, preferably low amounts of electrically-conductive carbon such as from 0.1 to 12% by weight, is used in combination with an amorphous or semi-crystalline thermoplastic polymer and a second semi-crystalline thermoplastic polymer having a different degree of crystallinity. As indicated in the '037 patent, preferably the carbon black has a nitrogen surface area of at least 125 m$^2$/g, and more preferably at least 200 m$^2$/g. Furthermore, the carbon black preferably has a DBPA of at least 75 cc/100 g and more preferably at least 100 cc/100 g. In the industry, typically high surface area carbon blacks have been used in the electromotive coating process since there was an understanding in the industry that high surface area carbon blacks would permit lower amounts of carbon black to achieve the desired conductive article. However, the high surface area carbon blacks are quite expensive and the use of lower amounts of carbon black, while possibly having benefits, also leads to certain detriments due to the low filler content in the article.

Accordingly, the present invention solves this problem by providing low surface area carbon blacks which are capable of being used in high loading amounts and which permit an excellent balance of properties which were not provided by previous attempts in this area.

Certain types of carbon black have been incorporated into polymer compositions to render resistive polymers electrically conductive. The degree of electrical conductivity imparted by a specific carbon black is related to its physical and chemical properties. This has been particularly useful in the preparation of polymer compounds for the cable industry.

Carbon black can also have an effect on the physical and mechanical properties of polymers, which, in turn, can have an effect on the operational lifetime of articles prepared from them. For example, any loss of mechanical properties could lead to premature failure of the parts under normal conditions of operation. Thus, the amount and type of carbon black used to impart improved conductivity to a polymer composition must be balanced with its effect on the overall properties of the polymer composition. Further, some carbon blacks, due to their size and chemistry, are difficult to disperse into polymeric compounds. Poor dispersibility can also lead to poor polymer properties and appearance. Additional mixing of the compound may improve the dispersion quality, but this additional working can also have a detrimental effect on the properties.

U.S. Pat. Nos. 5,902,517, 6,156,837, 6,086,792, 5,877,250, 5,844,037, and 5,484,838, as well as U.S. patent application Ser. No. 09/728706, each incorporated in their entirety by reference, relate to carbon blacks and semiconductive or conductive polymer compositions and articles. However, there remains a need to provide conductive polymer compositions using carbon blacks having high compound conductivity while at the same time having levels of toughness, stiffness, smoothness, tensile properties, etc. that are acceptable for use in automotive applications.

SUMMARY OF THE INVENTION

The present invention relates to a conductive polymer containing at least one polymer and at least one carbon black having an STSA of from about 10 to about 200 m$^2$/g, an I$_2$No of from about 15 to about 250 mg/g, a tinting strength of about 130% or less, a DBPA of from about 20 to about 450 cc/100 g, a CDBP of from about 20 to about 400 cc/100 g, a ratio of I$_2$No to STSA of from about 0.4 to about 2.5, a mean particle size of from about 14 to about 250 nm, and a % volatiles of less than about 0.5%, wherein the carbon black is present in an amount of from about 5 to about 40% by weight of the conductive polymer composition, and wherein the conductive polymer composition has a volume resistivity of greater than 100 ohm-cm at room temperature.

The present invention further relates to a conductive polymer composition containing at least one polymer and at least one carbon black having an STSA of from about 10 to about 200 m$^2$/g, an I$_2$No of from about 15 to about 250 mg/g, a tinting strength of about 130% or less, a DBPA of from about 20 to about 450 cc/100 g, a CDBP of from about 20 to about 400 cc/100 g, a ratio of I$_2$No to STSA of from about 0.4 to about 2.5, a mean particle size of from about 14 to about 250 nm, and a % volatiles of less than about 0.5%, wherein the carbon black is preferably present in an amount from about 5 to about 40% by weight of the conductive polymer composition.

The present invention further relates to a conductive polymer composition containing at least one polymer and at least one carbon black having an STSA of from about 46 to about 56 m$^2$/g, an I$_2$No of from about 60 to about 70 mg/g, a tinting strength of about 70% or less, a DBPA of from about 137 to about 147 cc/100 g, a CDBP of from about 85 to about 95 cc/100 g, a ratio of I$_2$No to STSA of from about 1.2 to about 1.4, a mean particle size of from about 37 to about 47 nm, and a % volatiles of less than about 1.0%, wherein the carbon black is preferably present in an amount of from about 10 to about 40% by weight of the polymer composition.

The present invention further relates to a conductive polymer composition containing at least one polymer and at least one carbon black having an STSA of from about 32 to about 42 m$^2$/g, an I$_2$No of from about 39 to about 49 mg/g, a tinting strength of about 60% or less, a DBPA of from about 112 to about 122 cc/100 g, a CDBP of from about 71 to about 81 cc/100 g, a ratio of I$_2$No to STSA of from about 1.1 to about 1.3, a mean particle size of from about 48 to about 58 nm, and a % volatiles of less than about 1.0%, wherein the carbon black is preferably present in an amount of from about 10 to about 40% by weight of the polymer composition.

The present invention further relates to a conductive polymer composition containing at least one polymer and at least one carbon black having an STSA of from about 55 to about 65 m$^2$/g, an I$_2$No of from about 63 to about 73 mg/g, a tinting strength of about 90% or less, a DBPA of from about 121 to about 31 cc/100 g, a CDBP of from about 85 to about 95 cc/100 g, a ratio of I$_2$No to STSA of from about 1.05 to about 1.25, a mean particle size of from about 26 to about 36 nm, and a % volatiles of less than about 1.0%, wherein the carbon black is preferably present in an amount of from about 10 to about 40% by weight of the polymer composition.

The present invention further relates to a conductive polymer composition containing at least one polymer and at least one carbon black having an STSA of from about 64 to about 74 m$^2$/g, an I$_2$No of from about 72 to about 82 mg/g, a tinting strength of about 90% or less, a DBPA of from about 188 to about 198 cc/100 g, a CDBP of from about 101 to about 111 cc/100 g, a ratio of I$_2$No to STSA of from about 1.05 to about 1.25, a mean particle size of from about 34 to about 44 nm, and a % volatiles of less than about 1.0%, wherein the carbon black is present in an amount of from about 10 to about 40% by weight of the polymer composition.

The present invention further relates to an automotive article, such as a component of an automotive fuel system or an article which is electrostatically painted, containing one or more of the polymer compositions described above. The present invention further relates to a method of electrostatic painting of such an article.

It is to be understood that both the foregoing general description and the following detailed description are exemplary and explanatory only and are intended to provide further explanation of the present invention, as claimed.

DETAILED DESCRIPTION OF THE INVENTION

The present invention relates to conductive polymer compositions and to their use in articles for automotive and other applications.

The conductive polymer composition of the present invention contain at least one carbon black having a statistical thickness surface area (STSA) of from about 10 to about 200 m$^2$/g, an I$_2$No of from about 15 to about 250 mg/g, a tinting strength of about 130% or less, a DBPA of from about 20 to about 450 cc/100 g, a CDBP of from about 20 to about 400 cc/100 g, a ratio of I$_2$No to STSA of from about 0.4 to about 2.5, a mean particle size of from about 14 to about 250 nm, and a % volatiles of less than about 5.0%.

The statistical thickness surface area is defined as the external surface area of the particle—that is, the total surface area minus the internal porosity. It can be measured by nitrogen adsorption following ASTM D5816. Preferably, the carbon blacks used in the conductive polymer compositions of the present invention have an STSA of from about 20 to about 100 m$^2$/g and more preferably have an STSA of from about 20 to about 70 m$^2$/g. Other ranges include from about 10 m$^2$/g to about 150 m$^2$/g or from about 10 m$^2$/g to about 50 m$^2$/g. These values relate to the carbon black as produced from the reactor (i.e., without any additives).

The I$_2$No also relates to the surface area of the carbon black and can be measured following ASTM D1510. Preferably, the carbon blacks used in the conductive polymer compositions of the present invention have an I$_2$No (without additives) of from about 20 to about 100 mg/g and more preferably have an I$_2$No of from about 20 to about 75 mg/g. Other ranges include from about 15 to about 200 mg/g, or from about 30 to about 150 mg/g, or from about 50 mg/g to 125 mg/g. It is preferred that the ratio of I$_2$No and STSA is from about 0.5 to about 2.0 and more preferably from about 1.0 to about 1.5.

DBPA and CDBP (crushed DBP) relate to the structure of the carbon black. These can be measured using ASTM D2414 and ASTM 3493-86 respectively. For the conductive polymer compositions of the present invention, it is preferred that the DBPA of the carbon black be from about 50 to about 300 cc/100 g and more preferably be from about 100 to about 250 cc/100 g and that the CDBP be from about 45 to about 250 cc/100 g and more preferably be from about 60 to about 175 cc/100 g.

Tinting strength can be measured using ASTM D3265. For these conductive polymer compositions, it is also preferred that the carbon blacks have a tinting strength of about 110% or less and more preferably about 90% or less or from about 10% to about 120%, or from about 10% to about 50%. The carbon black particle size, which can be measured by ASTM 3849-89, is preferably from about 14 to about 150 nm and more preferably from about 25 to about 80 nm, or from about 30 to about 50 nm.

The % volatiles is a measure of the amount of remaining chemicals and/or chemical groups on the carbon black. It can be measured by heating a sample of material at a constant temperature for a prescribed period of time and determining the amount of weight lost under those conditions. It is preferred that the carbon blacks used in the conductive polymer compositions of the present invention have a % volatiles of less than about 5.0% and more preferably have a % volatiles of less than about 1.0% (without additives) or less than 0.5% (without additives), when measured by heating to 1700 deg F. for 7 minutes.

There are several particularly preferred carbon blacks that can be used in the conductive polymer compositions of the present invention. One particularly preferred carbon black has an STSA of from about 46 to about 56 m$^2$/g, an I$_2$No of from about 60 to about 70 mg/g, a tinting strength of about 70% or less, a DBPA of from about 137 to about 147 cc/100 g, a CDBP of from about 85 to about 95 cc/100 g, a ratio of I$_2$No to STSA of from about 1.2 to about 1.4, a mean particle size of from about 37 to about 47 nm, and a % volatiles of less than about 1.0%. An example of such a carbon black is Black Pearls® 3500, commercially available from Cabot Corporation. It is preferred that this preferred carbon black is present in an amount of from about 10 to about 35% by weight of the polymer composition.

Another preferred carbon black has an STSA of from about 32 to about 42 m$^2$/g, an I$_2$No of from about 39 to about 49 mg/g, a tinting strength of about 60% or less, a DBPA of from about 112 to about 122 cc/100 g, a CDBP of from about 71 to about 81 cc/100 g, a ratio of I$_2$No to STSA of from about 1.1 to about 1.3, a mean particle size of from about 48 to about 58 nm, and a % volatiles of less than about 1.0%. An example of such a carbon black is Black Pearls® 3700, commercially available from Cabot Corporation. It is preferred that this preferred carbon black is present in an amount of from about 10 to about 35% by weight of the polymer composition.

Another preferred carbon black has an STSA of from about 55 to about 65 m$^2$/g, an I$_2$No of from about 63 to about 73 mg/g, a tinting strength of about 90% or less, a DBPA of from about 121 to about 131 cc/100 g, a CDBP of from about 85 to about 95 cc/100 g, a ratio of I$_2$No to STSA of from about 1.05 to about 1.25, a mean particle size of from about 26 to about 36 nm, and a % volatiles of less than about 1.0%. An example of such a carbon black is Black Pearls® 3515, which is a carbon black available from Cabot Corporation. It is preferred that this preferred carbon black be present in an amount of from about 10 to about 35% by weight of the polymer composition.

Another preferred carbon black has an STSA of from about 64 to about 74 m$^2$/g, an I$_2$No of from about 72 to about 82 mg/g, a tinting strength of about 90% or less, a DBPA of from about 188 to about 198 cc/100 g, a CDBP of from about 101 to about 111 cc/100 g, a ratio of I$_2$No to STSA of from about 1.05 to about 1.25, a mean particle size of from about 34 to about 44 nm, and a % volatiles of less than about 1.0%. An example of such a carbon black is Ensaco 250, commercially available from MMM Carbon. It is preferred that this preferred carbon black is from about 10 to about 35% by weight of the polymer composition. For purposes of the present invention, more than one type of carbon black or carbon product can be used. Thus, combinations of preferred carbon blacks used herein can be used and/or large surface area carbon blacks can be used in combination with the preferred carbon blacks. These combinations can be used in various ratios and/or amounts.

The carbon blacks used in the conductive polymer compositions of the present invention can be prepared using the furnace as described in U.S. Pat. No. 6,156,837 and U.S. Pat. No. 5,877,250, which are incorporated herein in its entirety by reference. Preferably, in following the process described in U.S. Pat. No. 5,877,250, the primary combustion level is less than about 600%, preferably less than about 400%, and more preferably from about 180 to about 350%. Preferably, the overall combustion level of the process is about 50% or less, preferably from about 20% to about 38%, more preferably from about 24% to about 32%. It is also preferred that the residence time for the carbon black forming reactions in the process for producing the carbon blacks of the present invention is from about 0.05 seconds to about 15 seconds, more preferably from about 0.10 seconds to about 10 seconds. With respect to the ratio of air to natural gas, this ratio is at least from about 15:1, preferably is less than about 60:1, and more preferably is less than about 40:1 and even more preferably is from about 18:1 to about 32:1. In referring to the furnace described in U.S. Pat. No. 5,877,250, the feedstock may be introduced either through a probe 15 or radially inward through a polarity of opening positioned in the wall of zone 12 at point 32 or a combination of the two. The feedstock introduced through the probe 15 can be altered by changing the number of injection openings. The angle of the openings can vary from a direction axially with the reaction centerline or radially up to and including perpendicularly to the reactor centerline. In addition, the position of the probe may be altered along the centerline of the reactor from position 32.

Finally, the feedstock sulfur amount is preferably less than about 8000 ppm, though higher amounts can be used. Generally, with the above-described preferred parameters in following the process described in U.S. Pat. No. 5,877,250, carbon blacks having the above-described properties of the present invention can be made. Further alterations to the process can be made by those skilled in the art in view of the present description once the desired parameters, as described above, are used as objectives in running the furnace to form the carbon blacks.

Preferably, the carbon blacks which are formed are furnace carbon blacks, however other carbon blacks can be made, such as channel blacks or acetylene blacks. The carbon blacks of the present invention can be in fluffy form or pelletized form and the pellets can be formed using conventional techniques which are known to those skilled in the art.

The carbon blacks used in the conductive polymer compositions of the present invention can be further treated with a variety of treating agents, such as binders and/or surfactants. The treating agents described in U.S. Pat. Nos. 5,725,650; 5,200,164; 5,872,177; 5,871,706; and 5,747,559, all incorporated herein in their entirety by reference, can be used in treating the carbon blacks of the present invention. Other preferred treating agents, including surfactants and/or binders, can be used and include, but are not limited to, polyethylene glycol; alkylene oxides such as propylene oxides and/or ethylene oxides, sodium lignosulfate; acetates such as ethyl-vinyl acetates; sorbitan monooleate and ethylene oxide; ethylene/styrene/butylacrylates/methyl methacrylate binders; copolymers of butadiene and acrylonitrile; and the like. Such binders are commercially available from such manufacturers as Union Carbide, Dow, ICI, Union Pacific, Wacker/Air Products, Interpolymer Corporation, and B. F. Goodrich. These binders are preferably sold under the trade names: Vinnapas LL462, Vinnapas LL870, Vinnapas EAF650, Tween 80, Syntran 1930, Hycar 1561, Hycar 1562, Hycar 1571, Hycar 1572, PEG 1000, PEG 3350, PEG 8000, PEG 20000, PEG 35000, Synperonic PE/F38, Synperonic PE/F108, Synperonic PE/F127, and Lignosite-458.

Generally the amount of treating agent used with the carbon blacks of the present invention can be the amounts recited in the above-described patents, for instance in an amount of from about 0.1% to about 50% by weight of the treated carbon black, though other amounts can be used depending upon the type of properties desired and the particular treating agent(s) being used.

The carbon black used in the conductive polymer compositions of the present invention can also be modified to form a modified carbon black having attached at least one organic group. The type of organic group will vary depending on the polymer used for the conductive composition as well as on the desired performance properties. This allows for greater flexibility by tailoring the modified carbon black to the specific application.

The modified carbon blacks can be modified using methods known to those skilled in the art such that organic groups are attached to the carbon black. This provides a more stable attachment of the groups onto the carbon black compared to adsorbed groups, such as polymers, surfactants, and the like. For example, the modified carbon blacks can be prepared using the methods described in U.S. Pat. Nos. 5,554,739, 5,851,280, 6,042,643, 5,707,432, and 5,837,045, and PCT Publication WO 99/23174, the descriptions of which are fully incorporated herein by reference.

The modified carbon blacks may be purified by washing, such as by filtration, centrifugation, or a combination of the two methods, to remove unreacted raw materials, byproduct salts and other reaction impurities. The products may also be isolated, for example, by evaporation or it may be recovered by filtration and drying using known techniques to those skilled in the art. Known techniques of ultrafiltration/diafiltration using a membrane or ion exchange may also be used to purify these modified carbon blacks. Such additional classification and purification methods are more fully described in PCT Publication WO 99/38921, the disclosure of which is fully incorporated herein by reference.

The amount of carbon black used in the conductive polymer compositions of the present invention depends on the properties of the carbon black and the desired properties of the resulting polymer composition. For example, the higher the surface area of the carbon black, the lower the loading needed to obtain desirable conductivity. However, higher surface area blacks are typically more difficult to disperse into a polymeric material. Lower surface area blacks, while easier to disperse, require higher loadings to obtain equivalent conductivity. Higher loadings of some carbon blacks can lead to deterioration of polymer properties. For the present invention, preferably the carbon black is present in an amount of from 5 to about 50% by weight of the total polymer composition. More preferably, the carbon black is present in an amount of from about 5 to about 30% and most preferably from about 15 to about 25% or from about 25% to about 40%.

With respect to the polymer present in the conductive polymer compositions of the present invention, the polymer can be any polymeric compound. Preferably, the polymer is one that is useful in automotive applications, such as a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, or a polyurethane. Blends of polymers containing one or more of these polymeric materials, where the described polymers are present either as the major component or the minor component, may also be used. The specific type of polymer can depend on the desired application. These are described in more detail below.

The conductive polymer compositions of the present invention may also include suitable additives for their known purposes and amounts. For example, the compositions of the present invention may also include such additives as crosslinking agents, vulcanizing agents, stabilizers, pigments, dyes, colorants, metal deactivators, oil extenders, lubricants, inorganic fillers, and the like.

The conductive polymer compositions of the present invention can be prepared using conventional techniques such as mixing the various components together using commercially available mixers. The composition may be prepared by batch or continuous mixing processes such as those well known in the art. For example, equipment such as discontinuous internal mixers, continuous internal mixers, reciprocating single screw extruder, twin and single screw extruder, etc. may be used to mix the ingredients of the formulations. The carbon black may be introduced directly into the polymer blend, or the carbon black may be introduced into one of the polymers before that polymer is blended with another polymer. The components of the polymer compositions of the present invention may be mixed and formed into pellets for future use in manufacturing such materials as articles for automotive applications.

The conductive polymer compositions of the present invention are particularly useful for preparing automotive articles. In particular, the conductive compositions can be used for components of an automotive fuel system such as, for example, a fuel inlet, filler neck, fuel tank, fuel line, fuel filter, and pump housing. In addition, the conductive polymer compositions of the present invention can be used in automotive applications in which electrostatic discharge protection and electrostatic dissipative properties are important. Examples include internal trim, dashboards, panels, bumper fascia, mirrors, seat fibers, switches, housings, and the like.

The automotive articles of the present invention can be prepared from the conductive polymer compositions of the present invention using any technique known to one skilled in the art. Examples include, but are not limited to, extrusion, multilayer coextrusion, blow molding, multilayer blow molding, injection molding, rotomolding, thermoforming, and the like.

In order to prepare these automotive articles, it may be preferable to use specific polymers or blends in order to attain the desired performance properties. For example, preferred polymers for the fuel system components include thermoplastic polyolefins (TPO), polyethylene (PE), polypropylene (PP), copolymers of propylene, ethylene propylene rubber (EPR), ethylene propylene diene terpolymers (such as EPDM), acrylonitrile butadiene styrene (ABS), acrylonitrile EPDM styrene (AES), polyvinylchloride (PVC), polystyrene (PS), polyamides (PA, such as PA6, PA66, PA11, PA12, and PA46), polycarbonate (PC), polybutylene terephthalate (PBT), polyethylene terephthalate (PET), polyphenylene oxide (PPO), and polyphenylene ether (PPE). Preferred polymer blends include, but are not limited to, PC/ABS, PC/PBT, PP/EPDM, PP/EPR, PP/PE, PA/PPO, and PPO/PP. The polymer compositions of the present invention can be optimized to attain the desired overall properties, such as conductivity, toughness, stiffness, smoothness, and tensile properties.

For automotive parts for electrostatic dissipative protection, preferred polymers include thermoplastic polyolefins (TPO), polyethylene (PE, such as LLDPE, LDPE, HDPE, UHMWPE, VLDPE, and mLLDPE), polypropylene, copolymers of polypropylene, ethylene propylene rubber (EPR), ethylene propylene diene terpolymers (such as EPDM), acrylonitrile butadiene styrene (ABS), acrylonitrile EPDM styrene (AES), polyoxymethylene (POM), polyamides (PA, such as PA6, PA66, PA11, PA12, and PA46), polyvinylchloride (PVC), tetraethylene hexapropylene vinylidenefluoride polymers (THV), perfluoroalkoxy polymers (PFA), polyhexafluoropropylene (HFP), polyketones (PK), ethylene vinyl alcohol (EVOH), copolyesters, polyurethanes (PU), polystyrene (PS), polycarbonate (PC), polybutylene terephthalate (PBT), polyethylene terephthalate (PET), polypheneylene oxide (PPO), and polyphenylene ether (PPE). Preferred blends include PC/ABS, PC/PBT, PP/EPDM, PP/EPR, PP/PE, PA/PPO, and PPO/PE. The polymer compositions used to prepare these automotive articles can also be optimized to attain the desired overall performance.

The present invention further relates to a method of electrostatic painting of an article, as well as to the resulting painted particle. This method involves the step of electrostatically applying paint to the surface of an article, such as an automotive article, which has been formed from the conductive polymer compositions of the present invention. As with the fuel system and electrostatic dissipative protection applications described above, some polymers are preferred for use in preparing the articles that are electrostatically painted. Examples of these polymers include thermoplastic polyolefins (TPO), polyethylene (PE), polypropylene (PP), copolymers of propylene, ethylene propylene rubber (EPR), ethylene propylene diene terpolymer (such as EPDM), acrylonitrile butadiene styrene (ABS), acrylonitrile EPDM styrene (AES), polyvinylchloride (PVC), polystyrene (PS), polyamides (PA, such as PA6, PA66, PA11, PA12, and PA46), polycarbonate (PC), polybutylene terephthalate (PBT), polyethylene terephthalate (PET), polyphenylene oxide (PPO), and polyphenylene ether (PPE). Preferred polymer blends include, but are not limited to, PC/ABS, PC/PBT, PP/EPDM, PP/EPR, PP/PE, PA/PPO, and PPO/PE. The conductive polymer compositions can be optimized in order to attain the desired overall performance, including conductivity, surface smoothness, paint adhesion, toughness, stiffness, and tensile properties.

The conductive polymer compositions of the present invention preferably provide a balance of beneficial properties which are useful in applications such as automotive applications. In particular, the polymer composition preferably has a volume resistivity that is greater than 100 ohm-cm and, more preferably, greater than 1000 ohm-cm, when measured at room temperature. Further, these compositions have a volume resistivity that is lower than $10^{12}$ ohm-cm, and, more preferably, lower than $10^9$ ohm-cm. This makes these compositions particularly useful for the automotive applications described above. Surface resistivity would also be excellent in the present invention, such as lower than $10^{12}$ ohm-cm and preferably less than $10^{10}$ or $10^8$ ohm-cm.

The present invention will be further clarified by the following examples, which are intended to be purely exemplary of the present invention.

EXAMPLES

Examples 1–3, and Comparative Examples 1–3

For the following examples, polymer compositions were prepared by compounding four different carbon blacks with a high impact propylene ethylene copolymer (having a melt-flow index (MFI) of 3 g/10 min at 190 deg C. using a 2.16 kg load) in a PR46 Buss KO kneader. The carbon blacks were fed by the two entries of the mixer. The processing conditions are shown in Table 1.

TABLE 1

| Output: | 12 Kg/h |
|---|---|
| Mixer Temperature: | 160° C. on screw |
| | 190° C. on barrel |
| Extruder Temperature: | 200° C. |
| Die Temperature: | 210° C. |
| Mixer screw speed: | 240 rpm |
| Extruder screw speed: | 12 rpm |

The properties of the four carbon blacks are shown in Table 2. Comp CB-A and Comp CB-B are conventional superconductive carbon blacks that have been used in the electrostatic paint and fuel systems for automotive applications and are used here to prepare the comparative polymer compositions. CB-1 and CB-2 are blacks used to prepare polymer compositions of the present invention.

TABLE 2

| Property | Test Procedure | CB-1 | CB-2 | Comp. CB-A | Comp. CB-B |
|---|---|---|---|---|---|
| $I_2No^*$ (mg/g) | ASTM D1510 | 44 | 65 | 1010 | 1217 |
| $STSA^*$ (m²/g) | ASTM D5816 | 36 | 50 | 802 | 1330 |
| $I_2No/STSA$ | | 1.22 | 1.3 | 1.26 | 1.92 |
| CDBPA (cc/100 g) | ASTM 3493-86 | 86 | 90 | 300 | 427 |
| DBPA (cc/100 g) | ASTM D2414 | 117 | 140 | 390 | 497 |
| Tint (%) | ASTM D3265 | 57 | 63 | 132 | 113 |
| Particle size (nm) | ASTM D3849-89 | 55 | 43 | 20 | 19 |
| % Volatiles | for 7 minutes at 1700 deg C. | 0.40 | 0.47 | 0.63 | 0.30 |

*Measured on blacks as produced (without any additives)

Table 3 below shows the levels of each carbon black used to prepare the polymer compositions of Examples 1–3 and Comparative Examples 1–3.

TABLE 3

| Experiment | Ex. 1 | Ex. 2 | Ex. 3 | Comp. Ex. 1 | Comp. Ex. 2 | Comp. Ex. 3 |
|---|---|---|---|---|---|---|
| Carbon Black Type | CB-1 | CB-2 | CB-2 | Comp CB-A | Comp CB-B | Comp CB-A |
| % Loading | 26.32 | 24.66 | 18.20 | 11.22 | 10.02 | 18.01 |
| SR | 4.70E+02 | 2.00E+02 | 1.30E+13 | 3.60E+02 | 1.20E+02 | 3.70E+01 |
| VR | 7.20E+01 | 2.80E+01 | 2.80E+12 | 3.60E+01 | 1.10E+01 | 2.30E+00 |
| Izod | 69.1 | 70.0 | 58.0 | 24.6 | 4.4 | 1.9 |
| Tensile Str. | 28.7 | 28.3 | 27.4 | 29.6 | 30.9 | 32.4 |
| Elongation | 43.6 | 45.4 | 69.4 | 35.3 | 25.3 | 8.5 |
| Flex. Mod. | 1232 | 1256 | 1167 | 1300 | 1514 | 1630 |

Table 3 also shows the properties of each of the polymer compositions that were prepared using the procedure described above. Each sample was then tested for toughness (Izod impact strength), volume resistivity, surface resistivity, tensile strength at yield, stiffness (flexural modulus), tensile elongation at break, and smoothness.

The volume resistivity (VR) of the compounds was measured on the plaques using a ASTM procedure D4496-87. The electrode setting used in the present method is also described in the norm BS2044, 1984 for rubber materials. The samples were injection molded to make plaques using Cabot test procedure CTM-E050A.

The surface resistivity (SR) was measured using an electrode system made of two conductive paint lines following a method based on the international standard EC 167. In the present method, the electrode system was applied to homogeneous plaques made by injection molding.

The Izod impact resistance was measured on the notched specimen made of injection molded conductive material as per ISO 180-1982 standard. Pendulum-type hammer (CEAST 6545/000) was used for these measurements.

The flexural modulus was measured as per ISO178 method using Tensile/flex dynamometer INSTRON 4466 or 4411 computer-interfaced 3-point bend fixture (5 or 10 kN capacity).

The tensile strength at yield and tensile elongation at break were measured on injection molded dumbells using INSTRON 4466 or 4411 tensile tester.

For Examples 1 and 2 and Comparative Examples 1 and 2, the weight percent loading of each carbon black was chosen in order to obtain equivalent conductivity (volume resistivity). Thus, in Examples 1 and 2, 25–26% of CB-1 and CB-2 were used while, for Comparative Examples 1 and 2, 10–11% of Comp. CB-A and Comp. CB-B were added.

The results in Table 3 show that the polymer compositions of the present invention (Examples 1 and 2, prepared with CB-1 and CB-2) provide higher Izod impact strength and elongation at the same conductivity level when compared to compositions prepared with conventional superconductive carbon blacks (Comparative Examples 1 and 2, prepared with Comp. CB-A and Comp. CB-B).

As mentioned previously, in order to achieve the same conductivity level as the comparative examples, higher loadings (weight percent) of carbon blacks CB-1 and CB-2 were used. Thus, the polymer compositions of Example 3 and Comparative Example 3 were prepared in order to compare compound performance at the same loading levels (18%). As can be seen from the results in Table 3, the polymer composition of the present invention (Example 3, prepared with CB-2) provides higher impact strength and elongation compared to the composition prepared using a conventional carbon black (Comparative Example 3, prepared with Comp. CB-A).

These results show that the polymer compositions of the present invention, which contain carbon blacks with the properties described, provide superior compound properties as compared to the conventional carbon blacks that are typically used for automotive application.

The foregoing description of preferred embodiments of the present invention has been presented for the purposes of illustration and description. It is not intended to be exhaustive or to limit the invention to the precise form disclosed. Modifications and variations are possible in light of the above teachings, or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of electrostatic painting an article comprising forming an article comprising a conductive polymer composition and coating at least a portion of said article by electrostatic painting, wherein said conductive polymer composition comprises at least one polymer and at least one carbon black having an STSA of from about 10 to about 200 $m^2/g$, an $I_2No$ of from about 15 to about 250 mg/g, a tinting strength of about 130% or less, a DBPA of from about 20 to about 450 cc/100 g, a CDBP of from about 20 to about 400 cc/100 g, a ratio of $I_2No$ to STSA of from about 0.4 to about 2.5, a mean particle size of from about 14 to about 250 nm, and a % volatiles of less than about 1.0%, wherein the carbon black comprises from about 5 to about 40% by weight of the conductive polymer composition, and wherein the conductive polymer composition has a volume resistivity of greater than about 100 ohm-cm at room temperature.

2. The method of claim 1, wherein the carbon black has an STSA of from about 20 to about 100 $m^2/g$, an $I_2No$ of from about 20 to about 100 $m^2/g$, a DBPA of from about 50 to about 300 cc/100 g, and a CDBP of from about 45 to about 250 cc/100 g.

3. The method of claim 1, wherein the carbon black has an STSA of from about 20 to about 70 $m^2/g$, an $I_2No$ of from about 20 to about 75 $m^2/g$, a DBPA of from about 100 to about 250 cc/100 g, and a CDBP of from about 60 to about 175 cc/100 g.

4. The method of claim 1, wherein the carbon black is present in an amount from about 15 to about 30% by weight of the polymer composition.

5. The method of claim 1, wherein the carbon black is present in an amount of from about 25 to about 40% by weight of the polymer composition.

6. The method of claim 1, wherein the conductive polymer composition has a volume resistivity of greater than about 1000 ohm-cm at room temperature.

7. A method of electrostatic painting an article comprising forming an article comprising a conductive polymer composition and coating at least a portion of said article by electrostatic painting, wherein said conductive polymer composition comprises at least one polymer and at least one carbon black having an STSA of from about 10 to about 200 $m^2/g$, an $I_2No$ of from about 15 to about 250 mg/g, a tinting strength of about 130% or less, a DBPA of from about 20 to about 450 cc/100 g, a CDBP of from about 20 to about 400 cc/100 g, a ratio of $I_2No$ to STSA of from about 0.4 to about 2.5, a mean particle size of from about 14 to about 250 nm, and a %volatiles of less than about 1.0%, wherein the carbon black comprises from about 5 to about 40% by weight of the conductive polymer composition.

8. The method of claim 7, wherein the carbon black has an STSA of from about 20 to about 100 $m^2/g$, an $I_2No$ of from about 20 to about 100 $m^2/g$, a DBPA of from about 50 to about 300 cc/100 g, and a CDBP of from about 45 to about 250 cc/100 g.

9. The method of claim 7, wherein the carbon black has an STSA of from about 20 to about 70 $m^2/g$, an $I_2No$ of from about 20 to about 75 $m^2/g$, a DBPA of from about 100 to about 250 cc/100 g, and a CDBP of from about 60 to about 175 cc/100 g.

10. The method of claim 7, wherein the conductive polymer composition has a volume resistivity of greater than about 100 ohm-cm at room temperature.

11. The method of claim 7, wherein the conductive polymer composition has a volume resistivity of greater than about 1000 ohm-cm at room temperature.

12. The method of claim 7, wherein said carbon black having an STSA of from about 46 to about 56 m$^2$/g, an I$_2$No of from about 60 to about 70 mg/g, a tinting strength of about 70% or less, a DBPA of from about 137 to about 147 cc/100 g, a CDBP of from about 85 to about 95 cc/100 g, a ratio of I$_2$No to STSA of from about 1.2 to about 1.4, a mean particle size of from about 37 to about 47 nm, and a % volatiles of less than about 1.0%, wherein the carbon black is present in an amount of from about 25 to about 40% by weight of the polymer composition.

13. The method of claim 7, wherein said carbon black having an STSA of from about 32 to about 42 m$^2$/g, an I$_2$No of from about 39 to about 49 mg/g, a tinting strength of about 60% or less, a DBPA of from about 112 to about 122 cc/100 g, a CDBP of from about 71 to about 81 cc/100 g, a ratio of I$_2$No to STSA of from about 1.1 to about 1.3, a mean particle size of from about 48 to about 58 nm, and a % volatiles of less than about 1.0%, wherein the carbon black is present in an amount of from about 25 to about 40% by weight of the polymer composition.

14. The method of claim 7, wherein said carbon black having an STSA of from about 55 to about 65 m$^2$/g, an I$_2$No of from about 63 to about 73 mg/g, a tinting strength of about 90% or less, a DBPA of from about 121 to about 131 cc/100 g, a CDBP of from about 85 to about 95 cc/100 g, a ratio of I$_2$No to STSA of from about 1.05 to about 1.25, a mean particle size of from about 26 to about 36 nm, and a % volatiles of less than about 1.0%, wherein the carbon black is present in an amount of from about 25 to about 40% by weight of the polymer composition.

15. The method of claim 7, wherein said carbon black having an STSA of from about 64 to about 74 m$^2$/g, an I$_2$No of from about 72 to about 82 mg/g, a tinting strength of about 90% or less, a DBPA of from about 188 to about 198 cc/100 g, a CDBP of from about 101 to about 111 cc/100 g, a ratio of I$_2$No to STSA of from about 1.05 to about 1.25, a mean particle size of from about 34 to about 44 nm, and a % volatiles of less than about 1.0%, wherein the carbon black is present in an amount of from about 25 to about 40% by weight of the polymer composition.

16. The method of claim 1, wherein the carbon black is a modified carbon black comprising the carbon black having attached at least one organic group.

17. The method of claim 1, wherein the carbon black is treated with a binder resin.

18. The method of claim 1, wherein the polymer comprises a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, a polyurethane, or combinations thereof.

19. The method of claim 7, wherein the carbon black is a modified carbon black comprising the carbon black having attached at least one organic group.

20. The method of claim 7, wherein the carbon black is treated with a binder resin.

21. The method of claim 7, wherein the polymer comprises a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, a polyurethane, or a combination thereof.

22. A conductive polymer composition comprising at least one polymer and at least one carbon black, wherein said carbon black has an STSA of from about 46 to about 56 m$^2$/g, an I$_2$No of from about 60 to about 70 mg/g, a tinting strength of about 70% or less, a DBPA of from about 137 to about 147 cc/100 g, a CDBP of from about 85 to about 95 cc/100 g, a ratio of I$_2$No to STSA of from about 1.2 to about 1.4, a mean particle size of from about 37 to about 47 nm, and a % volatiles of less than about 1.0%, wherein the carbon black is present in an amount of from about 25 to about 40% by weight of the polymer composition.

23. A conductive polymer composition comprising at least one polymer and at least one carbon black, wherein said carbon black has an STSA of from about 32 to about 42 m$^2$/g, an I$_2$No of from about 39 to about 49 mg/g, a tinting strength of about 60% or less, a DBPA of from about 112 to about 122 cc/100 , a CDBP of from about 71 to about 81 cc/100 g, a ratio of I$_2$No to STSA of from about 1.1 to about 1.3, a mean particle size of from about 48 to about 58 nm, and a % volatiles of less than about 1.0%, wherein the carbon black is present in an amount of from about 25 to about 40% by weight of the polymer composition.

24. A conductive polymer composition comprising at least one polymer and at least one carbon black, wherein said carbon black has an STSA of from about 55 to about 65 m$^2$/g, an I$_2$No of from about 63 to about 73 mg/g, a tinting strength of about 90% or less, a DBPA of from about 121 to about 131 cc/100 g, a CDBP of from about 85 to about 95 cc/100 g, a ratio of I$_2$No to STSA of from about 1.05 to about 1.25, a mean particle size of from about 26 to about 36 nm, and a % volatiles of less than about 1.0%, wherein the carbon black is present in an amount of from about 25 to about 40% by weight of the polymer composition.

25. The conductive polymer composition of claim 22, wherein the conductive polymer composition has a volume resistivity of greater than about 1000 ohm-cm at room temperature.

26. The conductive polymer composition of claim 23, wherein the conductive polymer composition has a volume resistivity of greater than about 1000 ohm-cm at room temperature.

27. The conductive polymer composition of claim 26, wherein the conductive polymer composition has a volume resistivity of greater than about 1000 ohm-cm at room temperature.

28. The conductive polymer composition of claim 22, wherein the carbon black is a modified carbon black comprising the carbon black having attached at least one organic group.

29. The conductive polymer composition of claim 23, wherein the carbon black is a modified carbon black comprising the carbon black having attached at least one organic group.

30. The conductive polymer composition of claim 24, wherein the carbon black is a modified carbon black comprising the carbon black having attached at least one organic group.

31. The conductive polymer composition of claim 22, wherein the carbon black is treated with a binder resin.

32. The conductive polymer composition of claim 23, wherein the carbon black is treated with a binder resin.

33. The conductive polymer composition of claim 24, wherein the carbon black is treated with a binder resin.

34. The conductive polymer composition of claim 22, wherein the polymer comprises a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, a polyurethane, or combinations thereof.

35. The conductive polymer composition of claim 23, wherein the polymer comprises a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, a polyurethane, or combinations thereof.

36. The conductive polymer composition of claim 24, wherein the polymer comprises a polyolefin, a vinylhalide polymer, a vinylidene halide polymer, a perfluorinated polymer, a styrene polymer an amide polymer, a polycarbonate, a polyester, a polyphenyleneoxide, a polyphenylene ether, a polyketone, a polyacetal, a vinyl alcohol polymer, a polyurethane, or combinations thereof.

37. A conductive polymer composition comprising at least one polymer and at least one carbon black, wherein said carbon black has an STSA of from about 64 to about 74 m$^2$ g, an $I_2$No of from about 72 to about 82 mg/g, a tinting strength of about 90% or less, a DBPA of from about 188 to about 198 cc/100 g, a CDBP of from about 101 to about 111 cc/100 g, a ratio of $I_2$No to STSA of from about 1.05 to about 1.25, a mean particle size of from about 34 to about 44 nm, and a % volatiles of less than about 1.0%, wherein the carbon black is present in an amount from about 25 to about 40% by weight of the polymer composition.

38. The conductive polymer composition of claim 37, wherein the conductive polymer composition has a volume resistivity of greater than about 1000 ohm-cm at room temperature.

39. The conductive polymer composition 37, wherein the carbon black is a modified carbon black comprising the carbon black having attached at least one organic group.

40. The conductive polymer composition of claim 37, wherein the carbon black is treated with a binder resin.

41. The conductive polymer composition of claim 37, wherein the polymer comprises a polyolefin, a vinylhalide polymer, a vinylidene halide polymer, a perfluorinated polymer, a styrene polymer, an amide polymer, a polycarbonate, a polyester, a polyphenyleneoxide, a polyphenylene ether, a polyketone, a polyacetal, a vinyl alcohol polymer, a polyurethan, or combinations thereof.

42. An article comprising the conductive polymer composition of claim 22.

43. An article comprising the conductive polymer composition of claim 23.

44. An article comprising the conductive polymer composition of claim 24.

45. The article of claim 42, wherein the article is a component of an automobile fuel system.

46. The article of claim 42, wherein the article is electrostatically painted.

47. The article of claim 43, wherein the article is a component of an automobile fuel system.

48. An article comprising the conductive polymer composition of claim 37.

49. The article of claim 48, wherein the article is a component of an automobile fuel system.

50. The article of claim 48, wherein the article is electrostatically painted.

51. The article of claim 43, wherein the article is electrostatically painted.

52. The article of claim 44, wherein the article is a component of an automobile fuel system.

53. The article of claim 44, wherein the article is electrostatically painted.

* * * * *